United States Patent
Yamada et al.

(10) Patent No.: US 11,608,821 B2
(45) Date of Patent: Mar. 21, 2023

(54) BALL NON-RETURN VALVE AND DIAPHRAGM PUMP

(71) Applicant: YAMADA CORPORATION, Tokyo (JP)

(72) Inventors: Kotaro Yamada, Sagamihara (JP); Satoru Suwabe, Sagamihara (JP)

(73) Assignee: YAMADA CORPORATION, Tokyo (JP)

( * ) Notice: Subject to any disclaimer, the term of this patent is extended or adjusted under 35 U.S.C. 154(b) by 0 days.

(21) Appl. No.: 17/251,294

(22) PCT Filed: Jun. 13, 2019

(86) PCT No.: PCT/JP2019/023530
§ 371 (c)(1),
(2) Date: Dec. 11, 2020

(87) PCT Pub. No.: WO2019/244777
PCT Pub. Date: Dec. 26, 2019

(65) Prior Publication Data
US 2021/0108630 A1   Apr. 15, 2021

(30) Foreign Application Priority Data
Jun. 18, 2018   (JP) .............................. JP2018-115405

(51) Int. Cl.
*F04B 43/02* (2006.01)
*F16K 15/04* (2006.01)
*F04B 53/10* (2006.01)

(52) U.S. Cl.
CPC .......... *F04B 43/02* (2013.01); *F04B 53/1007* (2013.01); *F16K 15/04* (2013.01); *F04B 53/1002* (2013.01)

(58) Field of Classification Search
CPC .. F04B 43/02; F04B 53/1002; F04B 53/1007; F16K 15/04; F16K 1/42
(Continued)

(56) References Cited

U.S. PATENT DOCUMENTS 2,252,924 A * 8/1941 Hale ....................... F16K 15/04
  137/533.13
2,776,172 A * 1/1957 Deitrickson .......... F04B 53/164
  277/580

(Continued)

FOREIGN PATENT DOCUMENTS

CN        208364818 U    1/2019
DE   20 2017 103 236 U1   9/2017
(Continued)

OTHER PUBLICATIONS

International Search Report, issued in PCT/JP2019/023530, dated Sep. 17, 2019.

*Primary Examiner* — Philip E Stimpert
(74) *Attorney, Agent, or Firm* — Birch, Stewart, Kolasch & Birch, LLP (57) ABSTRACT

A ball non-return valve that can be integrated with a diaphragm pump or the like, does not transmit strain generated by stress during valve assembly to a ball seal portion, and can stably maintain sealing performance, and a diaphragm pump are disclosed. The non-return valve includes a valve seat having a through-hole, and a ball that opens and closes a flow of a fluid through the through-hole. The valve seat made of a corrosion resistant material is composed of a first valve seat that can support the ball and seal the through-hole, and a second valve seat that has a substantially cylindrical shape surrounding the first valve seat and in which the space between a valve case and the second valve seat is sealed by an O-ring. Clearances d3 and d4 are formed between the first valve seat and the second valve seat, and a horizontal surface (Continued)

of a notched portion of the second valve seat is mounted on an upper surface of a flange portion of the first valve seat.

7 Claims, 8 Drawing Sheets

(58) Field of Classification Search
USPC .................................................. 277/580, 544
See application file for complete search history.

(56) References Cited

U.S. PATENT DOCUMENTS

| | | | | |
|---|---|---|---|---|
| 4,252,510 A | * | 2/1981 | Bromley | ............. F04B 43/0009 417/534 |
| 4,313,495 A | * | 2/1982 | Brandell | ................. E21B 41/00 166/105 |
| 4,445,532 A | * | 5/1984 | Mitchell | ............ G05D 16/2097 137/495 |
| 5,483,991 A | * | 1/1996 | D'Agostino | .............. F16K 1/34 137/514 |
| 6,899,127 B1 | * | 5/2005 | Swingley | ................ F16K 15/04 137/533.11 |
| 8,469,680 B2 | * | 6/2013 | Murata | ................. F04B 43/073 417/392 |
| 2014/0119952 A1 | * | 5/2014 | Adachi | ................... F16K 15/04 417/53 |

FOREIGN PATENT DOCUMENTS

| | | |
|---|---|---|
| JP | 62-95186 U | 6/1987 |
| JP | 2000-2350 A | 1/2000 |
| JP | 2018-9312 A | 1/2018 |
| JP | 6784721 B2 | 11/2020 |
| KR | 10-2000-0005603 A | 1/2000 |

* cited by examiner

BALL NON-RETURN VALVE AND DIAPHRAGM PUMP

TECHNICAL FIELD

The present invention relates to a ball non-return valve used to prevent a backflow of a fluid, and a diaphragm pump.

BACKGROUND ART

Figure 1:
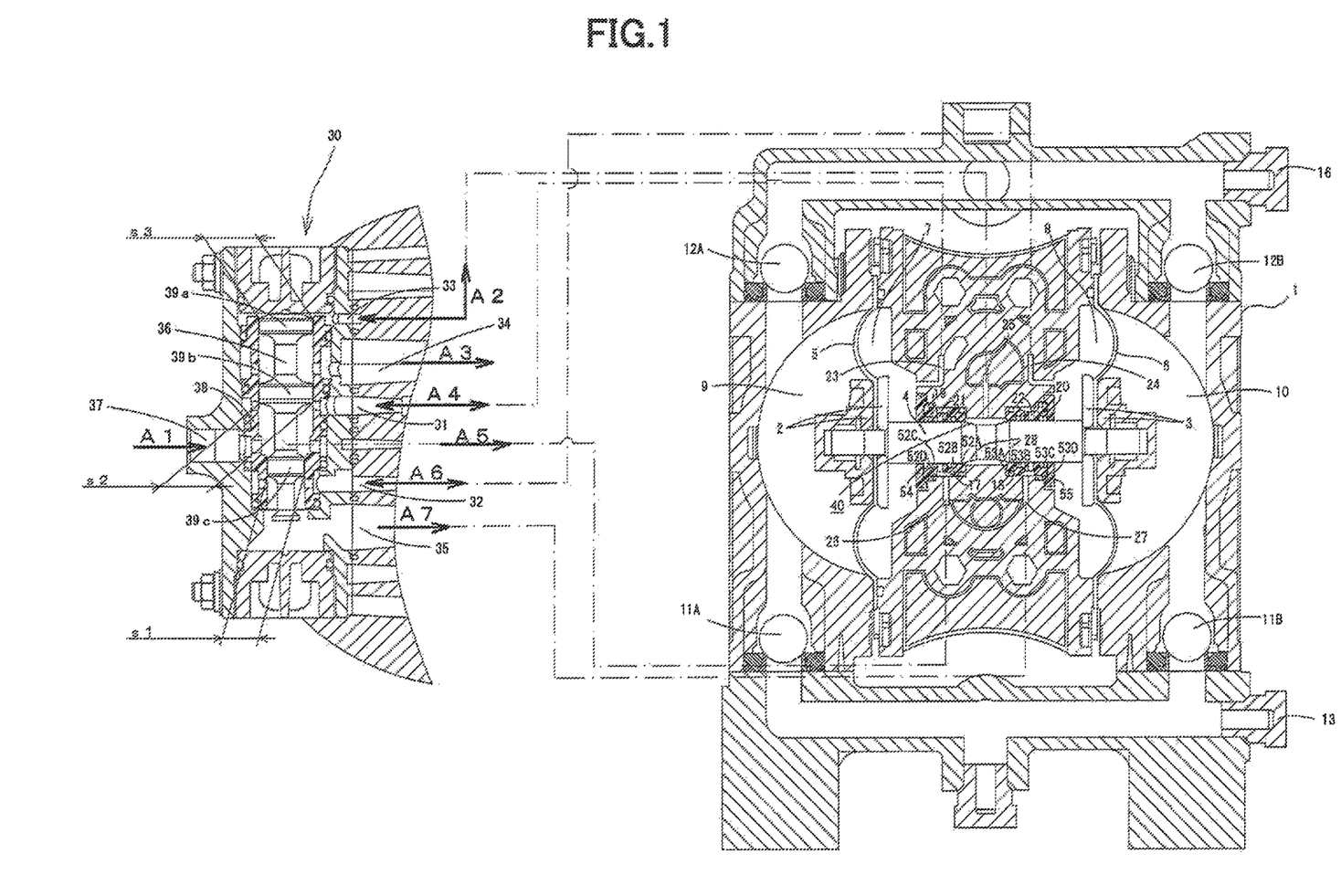
FIG. 1 is a partial cross-sectional view illustrating a structure of a diaphragm pump using a ball non-return valve according to an embodiment of the present invention and a partial cross-sectional view of a pump operating air switching mechanism (spool switching unit) in the diaphragm pump.

In a diaphragm pump, a non-return valve including a valve body such as a ball capable of opening and closing a flow passage of a liquid is used as a suction valve and a discharge valve for the purpose of preventing the backflow of a fluid to be conveyed (see Patent Literature 1). A non-return valve including, for example, a valve seat, a valve case, and a ball valve is known as the ball non-return valve. The valve seat has a through-hole that is opened and closed by the ball valve, and the valve case is a cylindrical body having a large diameter opening, and a small diameter opening that communicates with the large diameter opening via a reduced diameter part, and an inner peripheral edge of the large diameter opening is fitted into a step part of the valve seat. The valve case attached to a non-return valve attachment part of a pump main body, which is illustrated in FIG. 1 of Patent Literature 1, is known.

CITATION LIST

Patent Literature

Patent Literature 1: JP 62-95186 U

SUMMARY OF INVENTION

Technical Problem

In the ball non-return valve described above, the material used for the valve seat, the valve case, or the like may be restricted depending on a fluid to be transferred, and for a pump used to transfer a corrosive fluid such as a chemical, there may be no metal material that has a corrosion resistance to the corresponding fluid. Consequently, a material that has a corrosion resistance to the fluid, such as polypropylene (PP), is used for the valve seat, and a corrosion resistant material such as polytetrafluoroethylene (PTFE) is used for an O-ring as a sealing material.

However, the PTFE material used for the O-ring has a relatively higher strength than the PP material used for the valve seat. If the valve seat is distorted by stress during valve assembly, the valve seat is deformed, the sealing performance between the ball and the valve seat is degraded, and liquid leakage (backflow) occurs in the pump.

If all the liquid outlets of a diaphragm pump using the ball non-return valve that maintains the sealing performance are closed, an air pressure in an air chamber and a pressure on a liquid side in a pump chamber should be balanced with the diaphragm interposed therebetween, and the pump stops. However, since the pressure on the liquid side decreases due to the liquid leakage (backflow) described above, the pressure in one pump chamber decreases and the pump stopping state cannot be maintained, and the diaphragm moves accordingly, so that a low-speed operation continues.

Consequently, an object of the present invention is to provide a ball non-return valve that can be integrated with a diaphragm pump or the like, does not transmit strain generated by stress during valve assembly to a ball seal portion, and can stably maintain sealing performance, and to provide a diaphragm pump.

Solution to Problem

In order to solve the above problems, a ball non-return valve according to the present invention comprises a valve case, a valve seat, a ball, and an O-ring, wherein the valve seat made of a corrosion resistant material has a through-hole through which a flow of a fluid is opened and closed by the ball, the valve seat includes a first valve seat that can support the ball and seal the through-hole, and a second valve seat that has a substantially cylindrical shape surrounding the first valve seat and in which a space between the valve case and the second valve seat is sealed by the O-ring, a flange portion is formed at a lower portion of an outer peripheral surface of the first valve seat, a notched portion that can house the flange portion is formed at a lower portion of an inner peripheral surface of the second valve seat, a first clearance is formed between an upper outer diameter of the first valve seat and an upper inner diameter of the second valve seat, a second clearance is formed between a lower outer diameter of the first valve seat and a lower inner diameter of the second valve seat, and a horizontal surface of the notched portion of the second valve seat is mounted on an upper surface of the flange portion of the first valve seat.

Further, the valve case includes a mounting surface on which the first valve seat can be mounted, below the through-hole, and the first valve seat is horizontally movable on the mounting surface.

Further, the valve case includes a valve seat housing recess that can house the second valve seat, and the second valve seat is fitted into the valve seat housing recess of the valve case to be sealed via the O-ring.

Moreover, an upper portion of an inner peripheral surface of the second valve seat includes a tapered surface whose diameter increases from a lower side to an upper side.

Moreover, a horizontal mounting surface that is in surface contact with the mounting surface of the valve case is formed at a lower end of the notched portion of the second valve seat.

Furthermore, there is provided a diaphragm pump in which a pair of air chambers, and a pair of pump chambers partitioned from the air chambers by diaphragms are arranged at line symmetrical positions inside a pump main body in this order from an axis of symmetry, a suction port is connected to each of the pump chambers via a suction non-return valve, and an outlet is connected to each of the pump chambers via a discharge non-return valve, a center rod that is connected to a pair of the diaphragms at both ends penetrates the air chambers and is supported so as to be movable in an axial direction that is orthogonal to the axis of symmetry, air is alternately supplied to and exhausted from a pair of the air chambers to alternately increase and decrease volumes of a pair of the air chambers in order to fluctuate a pair of the diaphragms, and thus the center rod is reciprocated in the axial direction according to the fluctuation, wherein the ball non-return valve described above is used as the suction non-return valve and the discharge non-return valve.

Advantageous Effects of Invention

A ball non-return valve according to the present invention includes a valve case, a valve seat, a ball, and an O-ring, wherein the valve seat made of a corrosion resistant material has a through-hole through which a flow of a fluid is opened and closed by the ball, the valve seat includes a first valve seat that can support the ball and seal the through-hole, and a second valve seat that has a substantially cylindrical shape surrounding the first valve seat and in which a space between the valve case and the second valve seat is sealed by the O-ring, a flange portion is formed at a lower portion of an outer peripheral surface of the first valve seat, a notched portion that can house the flange portion is formed at a lower portion of an inner peripheral surface of the second valve seat, a first clearance is formed between an upper outer diameter of the first valve seat and an upper inner diameter of the second valve seat, a second clearance is formed between a lower outer diameter of the first valve seat and a lower inner diameter of the second valve seat, and a horizontal surface of the notched portion of the second valve seat is mounted on an upper surface of the flange portion of the first valve seat. Consequently, the strain generated by stress during valve assembly is not transmitted to a ball seal portion, and sealing performance can be stably maintained.

Furthermore, according to the ball non-return valve of the present invention, the valve case includes a mounting surface on which the first valve seat can be mounted, below the through-hole, and the first valve seat is horizontally movable on the mounting surface. Consequently, the strain generated by stress during valve assembly is not transmitted to the ball seal portion, and the sealing performance can be stably maintained.

Moreover, according to the ball non-return valve of the present invention, the valve case includes a valve seat housing recess that can house the second valve seat, and the second valve seat is fitted into the valve seat housing recess of the valve case to be sealed via the O-ring. Consequently, the second valve seat can be efficiently sealed.

Further, according to the ball non-return valve of the present invention, an upper portion of an inner peripheral surface of the second valve seat includes a tapered surface whose diameter increases from a lower side to an upper side. Consequently, even if the ball seal portion is deformed by colliding with the ball, the first valve seat does not contact the second valve seat, and it is possible to prevent the sealing performance of the ball and the first valve seat being degraded by the collision.

Further, according to the ball non-return valve of the present invention, a horizontal mounting surface that is in surface contact with the mounting surface of the valve case is formed at a lower end of the notched portion of the second valve seat. Consequently, the second valve seat can be sealed more efficiently.

Further, according to the diaphragm pump of the present invention, there is provided a diaphragm pump in which a pair of air chambers, and a pair of pump chambers partitioned from the air chambers by diaphragms are arranged at line symmetrical positions inside a pump main body in this order from an axis of symmetry, a suction port is connected to each of the pump chambers via a suction non-return valve, and an outlet is connected to each of the pump chambers via a discharge non-return valve, a center rod that is connected to a pair of the diaphragms at both ends penetrates the air chambers and is supported so as to be movable in an axial direction that is orthogonal to the axis of symmetry, air is alternately supplied to and exhausted from a pair of the air chambers to alternately increase and decrease volumes of a pair of the air chambers in order to fluctuate a pair of the diaphragms, and thus the center rod is reciprocated in the axial direction according to the fluctuation, wherein the ball non-return valve described above is used as the suction non-return valve and the discharge non-return valve. Consequently, liquid leakage inside the pump is prevented, and when all the liquid outlets are closed, the pump can be reliably stopped without continuing a low-speed operation.

BRIEF DESCRIPTION OF DRAWINGS

FIGS. 2A and 2B are partial cross-sectional views of the spool switching unit in the diaphragm pump of FIG. 1.

FIGS. 3A and 3B are cross-sectional views of a switching port mechanism and each ball non-return valve in the diaphragm pump of FIG. 1.

DESCRIPTION OF EMBODIMENTS

Hereinafter, a detailed description will be given with reference to the drawings by using a diaphragm pump using a ball non-return valve according to an embodiment of the present invention as an example. As an example of a mechanism of switching air to left and right air chambers of the diaphragm pump, a spool switching unit 30 and a switching port mechanism 40 to be described later are adopted.

Figure 2A:
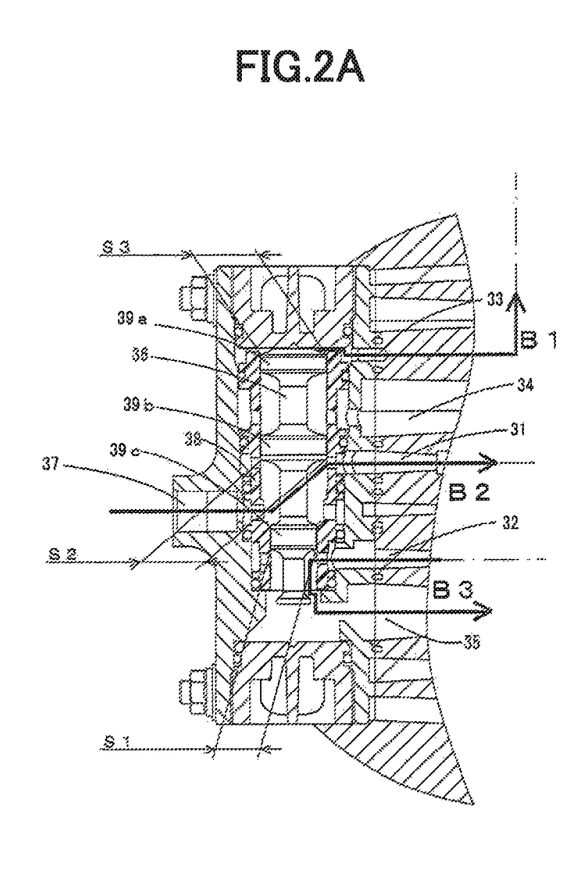
FIG. 2A is a view illustrating an air supply and exhaust passage at each port when a spool is at an upper end position.
Figure 2B:
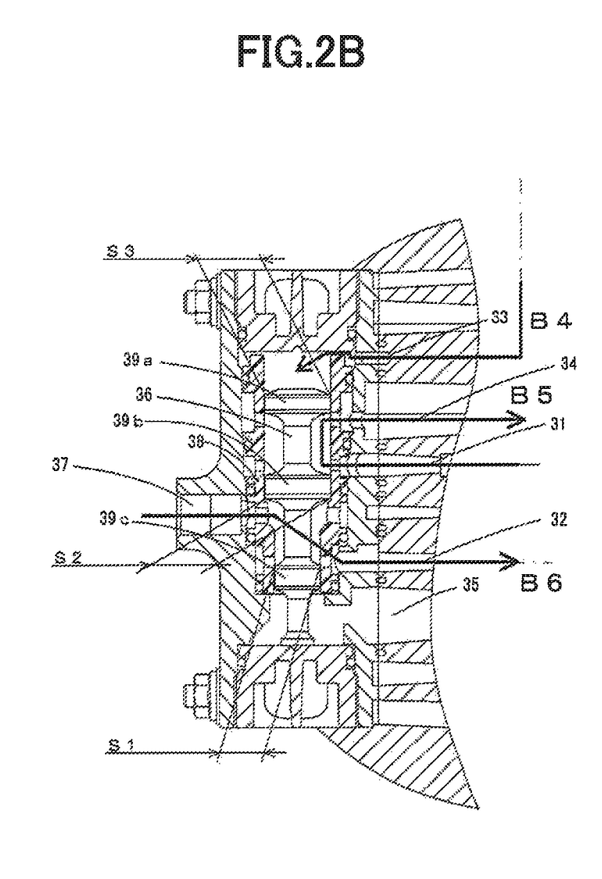
FIG. 2B is a view illustrating the air supply and exhaust passage at each port when the spool is at a lower end position.

FIG. 1 is a partial cross-sectional view illustrating a structure of the diaphragm pump using the ball non-return valve according to an embodiment of the present invention and a partial cross-sectional view of the pump operating air switching mechanism 30 (spool switching unit) in the diaphragm pump. Arrows A1 to A7 in the drawing indicate the directions of air supply or exhaust, and double-headed arrows indicate that air supply and exhaust are alternately performed. FIGS. 2A and 2B are partial cross-sectional views of the spool switching unit 30 in the diaphragm pump of FIG. 1. FIG. 2A is a view illustrating an air supply and exhaust passage at each port when a spool 36 is at an upper end position, and FIG. 2B is a view illustrating the air supply and exhaust passage at each port when the spool 36 is at a lower end position. Arrows B1 to B6 in the drawings indicate the directions of air supply or exhaust. In the following, the side of a land 39a of the spool switching unit 30 is an upper side, and the side of a land 39c side of the spool switching unit 30 is a lower side, for convenience of description.

In the diaphragm pump, a pair of air chambers 7 and 8 and a pair of pump chambers 9 and 10 partitioned from the air chambers 7 and 8 by diaphragms 5 and 6 are arranged at line symmetrical positions inside a pump main body 1 in this order from the axis of symmetry. The paired diaphragms 5 and 6 are sandwiched by disk members 2 and 3 at their central portions, sandwiched and fixed to the pump main body 1 at their outer peripheral portions, and are connected to both ends of a center rod 4. The center rod 4 penetrates the air chambers 7 and 8 and is supported so as to be movable in an axial direction that is orthogonal to the axis of symmetry. The spool switching unit 30 is operated to alternately supply and exhaust air from air supply and exhaust ports 31 and 32 to the paired air chambers 7, 8 through air supply and exhaust holes 23, 24 of the pump main body, so that the volumes of the paired air chambers 7 and 8 are alternately increased and decreased. As a result, the paired diaphragms 5 and 6 are fluctuated, and the center rod 4 reciprocates in the axial direction according to this fluctuation.

A suction port 13 is connected to the pump chambers 9 and 10 on both sides via suction non-return valves 11A and 11B, and an outlet 16 is connected to the pump chambers 9 and 10 via discharge non-return valves 12A and 12B. Further, the air chambers 7, 8 on both sides communicate with the air supply and exhaust ports 31 and 32 that alternately supply and exhaust air by the spool switching unit 30 via the air supply and exhaust holes 23 and 24. The spool switching unit 30 is installed in the central portion of the pump main body 1 by bolting. Bolts can be easily attached and removed, and thus the maintenance of the inside of the spool switching unit 30 is easily performed. In FIG. 1, the spool switching unit 30 is taken out for convenience of description.

A groove 28 in the central portion of the center rod 4 functions an air port for switching upward and downward movement directions of the spool 36 in the spool switching unit 30, and together with guide bushes A 17 and 18 and guide bushes B 19 and 20 that are bearings when the center rod 4 reciprocates in the axial direction, function as the switching port mechanism 40 of the spool 36 in the spool switching unit 30.

The guide bushes A 17 and 18 have an annular shape, and include O-ring grooves that hold O-rings 52A, 52B, 53A, and 53B on an inner diameter outer side and an outer diameter inner side to define an air chamber of the switching port mechanism 40. The guide bushes A 17 and 18 are inserted from outside on both sides of the pump main body 1 toward the center of a line symmetry axis, and sealed to the pump main body 1 and the center rod 4 via the O-rings 52A, 52B, 53A, and 53B to support the center rod 4.

The guide bushes B 19 and 20 have an annular shape, include a step on the inner diameter outer side so as to rise one step from an inner diameter side to an outer diameter side. The guide bushes B 19 and 20 have holes as an air supply port for switching port 21 and an exhaust port for switching port 22, which are formed in outer peripheral surfaces that are lowered inward by one step toward the center in an inner diameter direction. The guide bushes B 19 and 20 include O-ring grooves that hold O-rings 52C, 52D, 53C, and 53D in outer peripheral surfaces rising by one step on the inner diameter outer side and on the outer diameter inner side to define the air chamber of the switching port mechanism 40. After the guide bushes A 17 and 18 are inserted, the guide bushes B 19 and 20 are inserted from outside on both sides of the pump main body 1 toward the center of the line symmetry axis, and sealed to the pump main body 1 and the center rod 4 via the O-rings 52C, 52D, 53C, and 53D to support the center rod 4.

The guide bushes A 17 and 18 and the guide bushes B 19 and 20 are fixed to the pump main body from outside by guide bush holders 54 and 55.

Figure 3A:
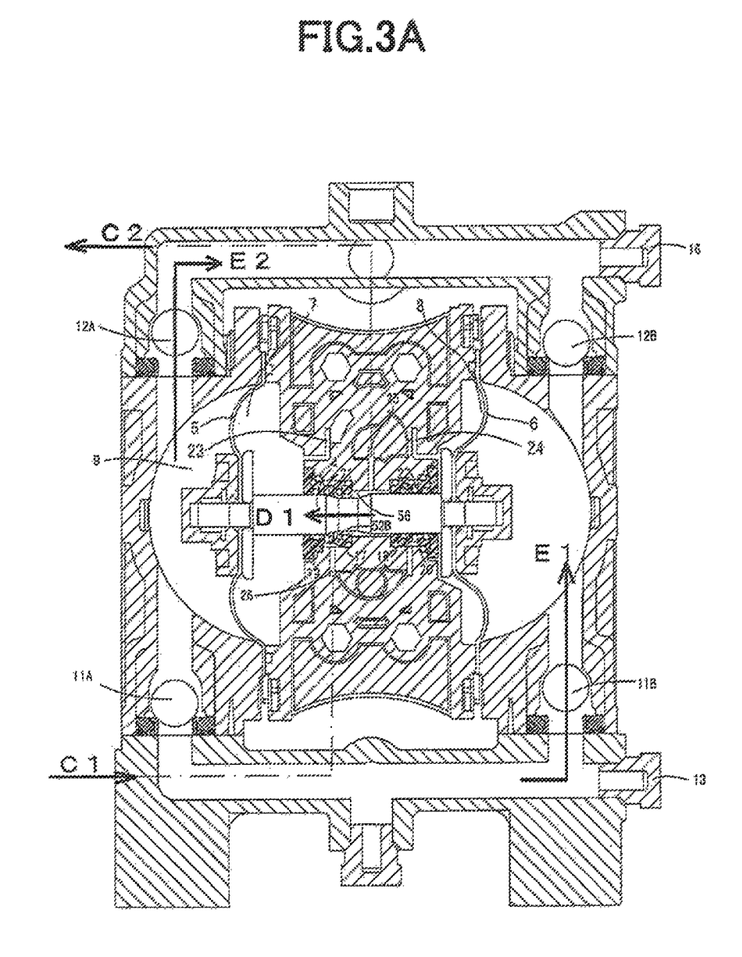
FIG. 3A is a view illustrating a state where air is supplied to a switching port of the spool switching unit, and a fluid is sucked in and discharged from a pump chamber when a center rod moves across an O-ring supported in an O-ring groove on an outer diameter inner side of a guide bush A.
Figure 3B:
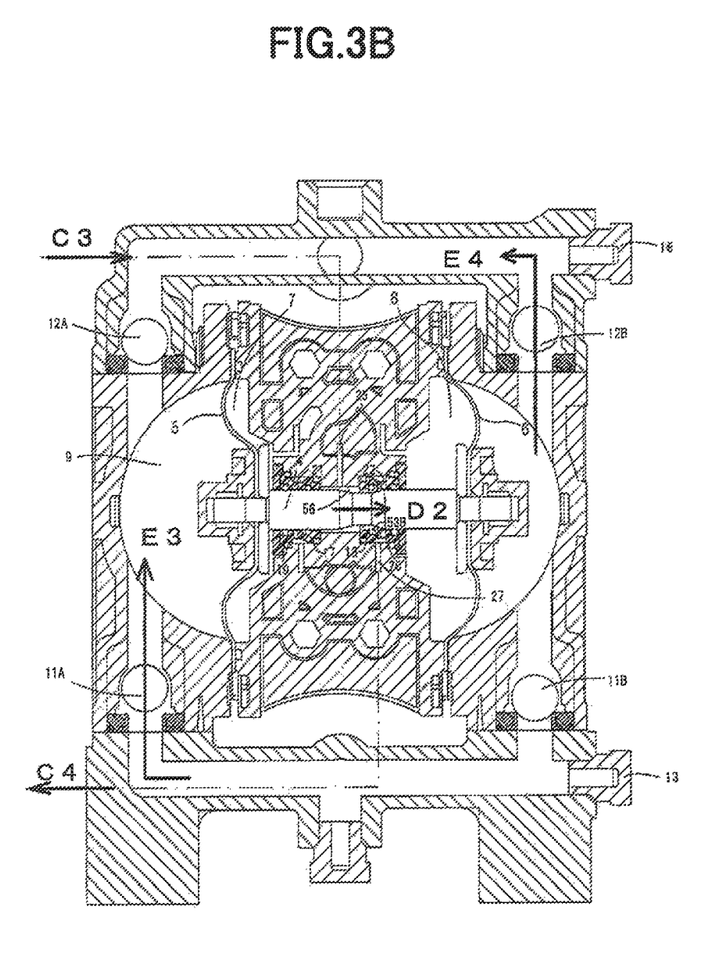
FIG. 3B is a view illustrating a state where air is exhausted to a dedicated exhaust port of the spool switching unit, and the fluid is sucked in and discharged from the pump chamber when the center rod moves across the O-ring supported in the O-ring groove on the outer diameter inner side of the guide bush A.

As illustrated in FIGS. 3A and 3B, air is constantly supplied from a dedicated air supply hole 26 of the pump main body 1 to the air supply port for switching port 21 (see arrow A5 in FIG. 1). The exhaust port for switching port 22 communicates with a dedicated air exhaust hole 27 of the pump main body. When the central groove 28 of the center rod 4 moves across the O-rings 52B and 53B supported by the O-ring grooves on the outer diameter inner side of the guide bushes A 17 and 18, air is supplied to and exhausted from a central air chamber 56, and the function of the switching port mechanism 40 is achieved.

FIGS. 3A and 3B are cross-sectional views of the switching port mechanism 40 and each ball non-return valve in the diaphragm pump of FIG. 1. FIG. 3A is a view illustrating a state where air is supplied to a switching port 33 of the spool switching unit 30 (arrow C2), and a fluid in a pump chamber is sucked (arrow E1) and discharged (arrow E2) when the center rod 4 moves across the O-ring 52B supported in the O-ring groove on the outer diameter inner side of the guide bush A 17. FIG. 3B is a view illustrating a state where air is exhausted to a dedicated air exhaust port 35 of the spool switching unit 30 (arrow C4) and the fluid in the pump chamber is sucked (arrow E3) and discharged (arrow E4) when the center rod moves across the O-ring 53B supported in the O-ring groove on the outer diameter inner side of the guide bush A 18. In FIGS. 3A and 3B, an arrow C1 indicates supply of air from the arrow A5 in FIG. 1, an arrow C3 indicates exhaust of air from the arrow A2 in FIG. 1, and arrows D1 and D2 indicate the movement direction of the center rod 4.

This switching port mechanism 40 can prevent the spool 36 from stopping at an intermediate position in the spool switching unit 30. As air is supplied and exhausted from a central hole 25 of the pump main body 1 to the switching port 33 of the spool switching unit 30 according to the movement of the diaphragms 5 and 6 immediately before the end of an air supply and exhaust operation by the diaphragms 5 and 6, the spool 36 is reliably switched.

As illustrated in FIGS. 2A and 2B, the spool switching unit 30 includes an air supply port 37 to the pump. The spool 36 slides in a sleeve 38, so that air is supplied to and exhausted from the inner air chambers 7 and 8 of the diaphragms 5 and 6. A pressure receiving area s1 of the land 39c to which an air pressure is applied from above, a pressure receiving area s2 of the land 39b to which an air pressure is applied to from below, and a pressure receiving area s3 of the land 39a to which an air pressure is applied from above have a relationship that is s1<s2<s3. The spool 36 slides by using the difference in air pressure generated according to the pressure receiving area ratio.

Further, as illustrated in FIGS. 2A and 2B, the air supplied and exhausted by the spool switching unit 30 flows in a passage formed by the spool 36 and the sleeve 38 to pass through the ports including the switching port 33 where air is supplied and exhausted by the switching port mechanism 40, the air supply and exhaust ports 31 and 32 to the air chambers 7, 8 of the pump main body 1, and the dedicated air exhaust ports 34 and 35, and moves to the side of the pump main body 1.

Next, an operation of the diaphragm pump will be described. Air is supplied from the air supply port 37 to the spool switching unit 30 with a predetermined pressure. When the spool 36 is at the upper end position (see FIG. 2A), air is supplied to the air chamber 7 of the pump main body 1 through the air supply and exhaust port 31 (arrow B2 in FIG. 2A). At this time, the air in the air chamber 8 on the opposite side is exhausted from the air supply and exhaust port 32 to the atmosphere through the dedicated air exhaust port 35 (direction of arrow B3 in FIG. 2A).

Consequently, the diaphragms 5 and 6 and the center rod 4 move to the left (arrow D1 in FIG. 3A), and the diaphragm 5 pushes the fluid in the left pump chamber 9 to the outlet 16 (arrow E2 in FIG. 3A), whereas the diaphragm 6 sucks the fluid from the suction port 13 into the pump chamber 10 on the right side (arrow E1 in FIG. 3A).

Immediately before the end of the movement of the center rod 4 to the left, the center rod 4 moves across the O-ring 52B supported by the O-ring groove on the outer diameter inner side of the guide bush A 17, and the air from the dedicated air supply hole 26 of the pump main body 1 is supplied into the switching port 33 through the air supply port for switching port 21, the central air chamber 56, and the central hole 25 of the pump main body (arrow B4 in FIG. 2B).

At this time, since the pressure receiving areas s1, s2, and s3 to which the air pressure of the spool 36 is applied have the relationship of s1<s2<s3 described above, the downward pressure applied to the pressure receiving area s3 by supplying air to the switching port 33 (arrow B4 in FIG. 2B) is larger than the upward pressure due to the pressure receiving area difference s2−s1 in the passage that air is supplied through the air supply and exhaust port 32, and thus the spool 36 moves downward toward the lower end position (see FIG. 2B).

When the spool 36 is at the lower end position, air is supplied to the air chamber 8 of the pump main body 1 through the air supply and exhaust port 32 (arrow B6 in FIG. 2B). At this time, the air in the air chamber 7 on the opposite side is exhausted from the air supply and exhaust port 31 to the atmosphere through the dedicated air exhaust port 34 (direction of arrow B5 in FIG. 2B).

Consequently, the diaphragms 5 and 6 and the center rod 4 move to the right (arrow D2 in FIG. 3B), and the diaphragm 6 pushes the fluid in the right pump chamber 10 to the outlet 16 (arrow E4 in FIG. 3B), whereas the diaphragm 5 sucks the fluid from the suction port 13 into the pump chamber 9 on the left side (arrow E3 in FIG. 3B).

Immediately before the end of the movement of the center rod 4 to the right, the center rod 4 moves across the O-ring 53B supported by the O-ring groove on the outer diameter inner side of the guide bush A 18, and the air in the switching port 33 is exhausted to the atmosphere through the central hole 25 of the pump main body, the central air chamber 56, the exhaust port for switching port 22, and the dedicated air exhaust hole 27 of the pump main body 1 (arrow C4 in FIG. 3B).

At this time, the inside of the switching port 33 is in an exhaust state (arrow B1 in FIG. 2A), and thus no pressure due to air is applied to the pressure receiving area s3. The upward pressure applied to the pressure receiving area s2 in the passage that air is supplied through the air supply and exhaust port 31 and the downward pressure applied to the pressure receiving area s1 have a relationship of s2>s1, and thus the spool 36 moves upward toward the upper end position (see FIG. 2A).

As the spool 36 vertically moves by supplying and exhausting air to and from the switching port 33 in the switching port mechanism 40, air is supplied to and exhausted from the left and right air chambers 7 and 8 of the pump main body 1, and the pump operation is repeatedly performed.

Meanwhile, a ball non-return valve 14 composed of a valve case 80, a valve seat 60, a ball 50, and an O-ring 51 is used for the ball non-return valves 11A, 11B, 12A, 12B in the diaphragm pump, as illustrated in FIGS. 4 to 7, for example.

Figure 4:
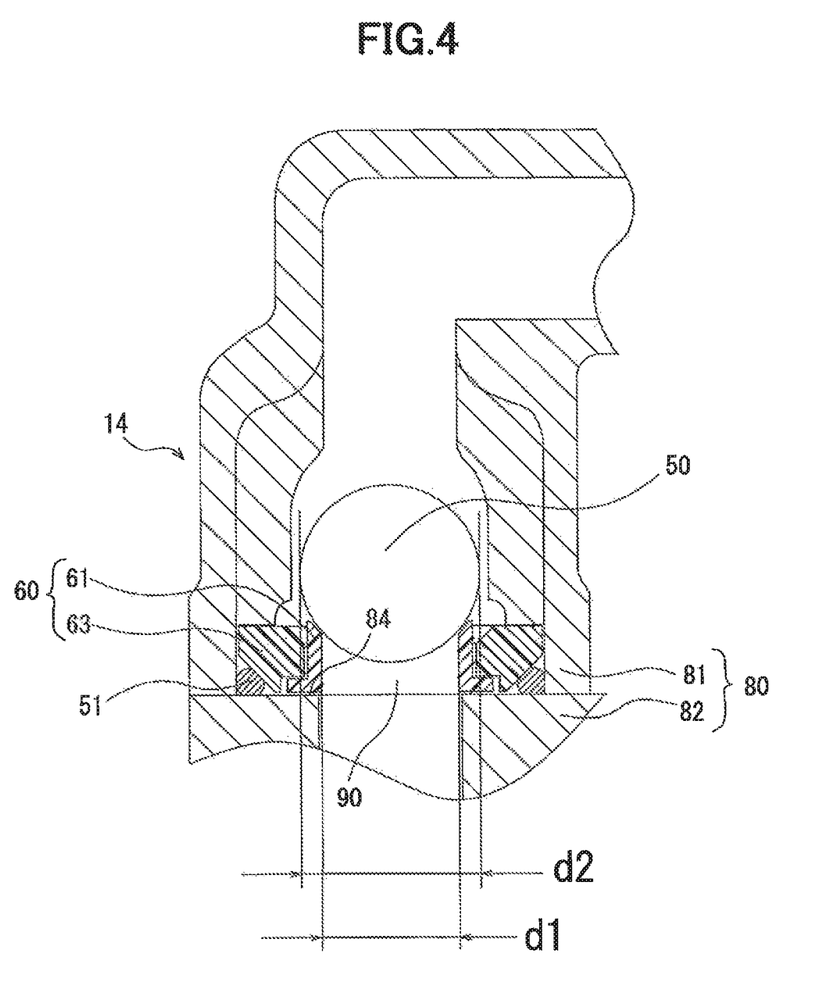
FIG. 4 is a cross-sectional view illustrating a structure of the ball non-return valve used in the diaphragm pump of FIG. 1.
Figure 5:
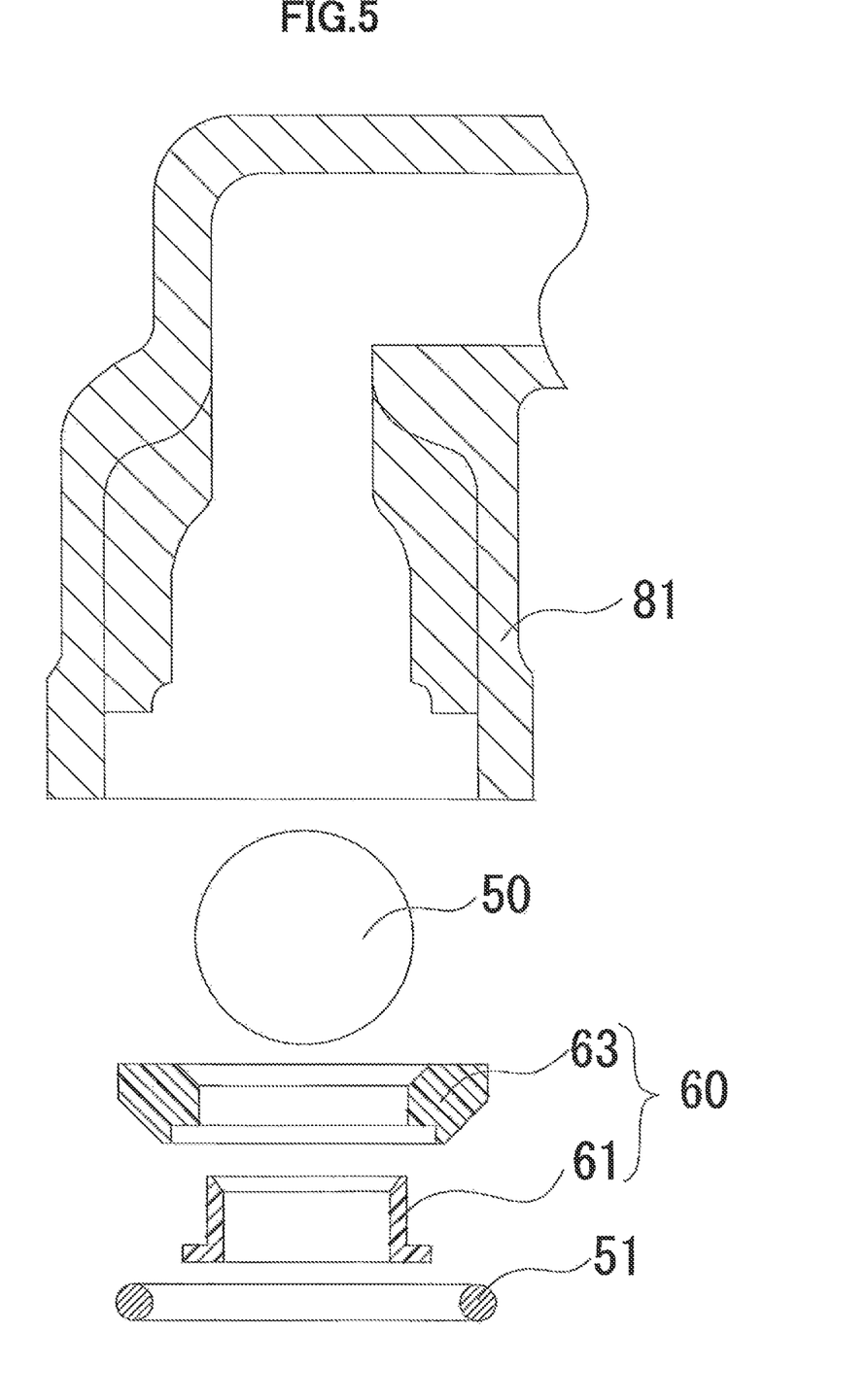
FIG. 5 is an exploded cross-sectional view of the ball non-return valve of FIG. 4.
Figure 6A:
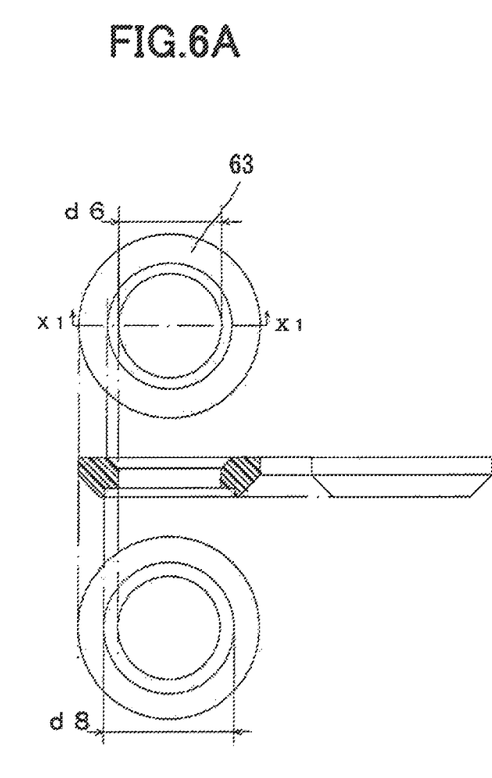
FIG. 6A is a plan view of a second valve seat of FIG. 4, a cross-sectional view taken along a line X1-X1 of the plan view, a side view, and a bottom view.
Figure 6B:
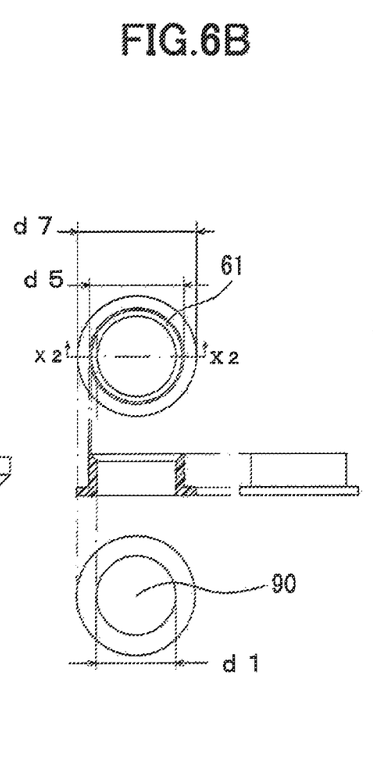
FIG. 6B is a plan view of a first valve seat of FIG. 4, a cross-sectional view taken along a line X2-X2 of the plan view, a side view, and a bottom view.
Figure 6C:
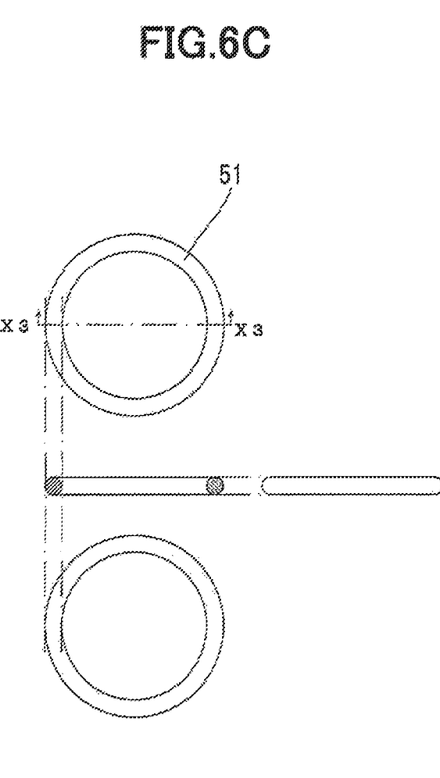
FIG. 6C is a plan view of an O-ring of FIG. 4, a cross-sectional view taken along a line X3-X3 of the plan view, a side view, and a bottom view.

The valve seat 60 has a through-hole 90 through which the flow of a fluid is opened and closed by the ball 50. The valve case 80 may have a separated structure of an upper valve case 81 that covers the ball 50 so as to be movable between a position where the flow of a fluid is opened and a position where the flow of a fluid is closed, that has an opening communicating with the through-hole 90 in the valve seat 60 to allow a fluid to flow, and that covers the valve seat 60 and the O-ring 51 from above, and a lower valve case 82 that has an opening communicating with the through-hole 90 to allow a fluid to flow and that supports the valve seat 60 and the O-ring from below, or may have an integrated structure.

The valve seat 60 is made of a corrosion resistant material, for example, polypropylene (PP), polyvinylidene fluoride (PVDF), perfluoroalkoxy alkane (PFA), or the like, and the O-ring 51 as a sealing material is made of a corrosion resistant material, for example, polytetrafluoroethylene (PTFE), perfluoroalkoxy alkane (PFA), perfluoroelastomer (FFKM), or the like.

The valve seat 60 is composed of two independent parts, that is, a first valve seat 61 that can support the ball 50 and seal the through-hole 90, and a second valve seat 63 that has a substantially cylindrical shape surrounding the first valve seat 61 and in which the space between the valve case 80 and the second valve seat 63 is sealed by the O-ring 51. Further, the first valve seat 61 is designed such that an inner diameter d1 is smaller than a diameter d2 of the ball 50 in order to prevent the housed ball 50 from falling off.

Figure 7:
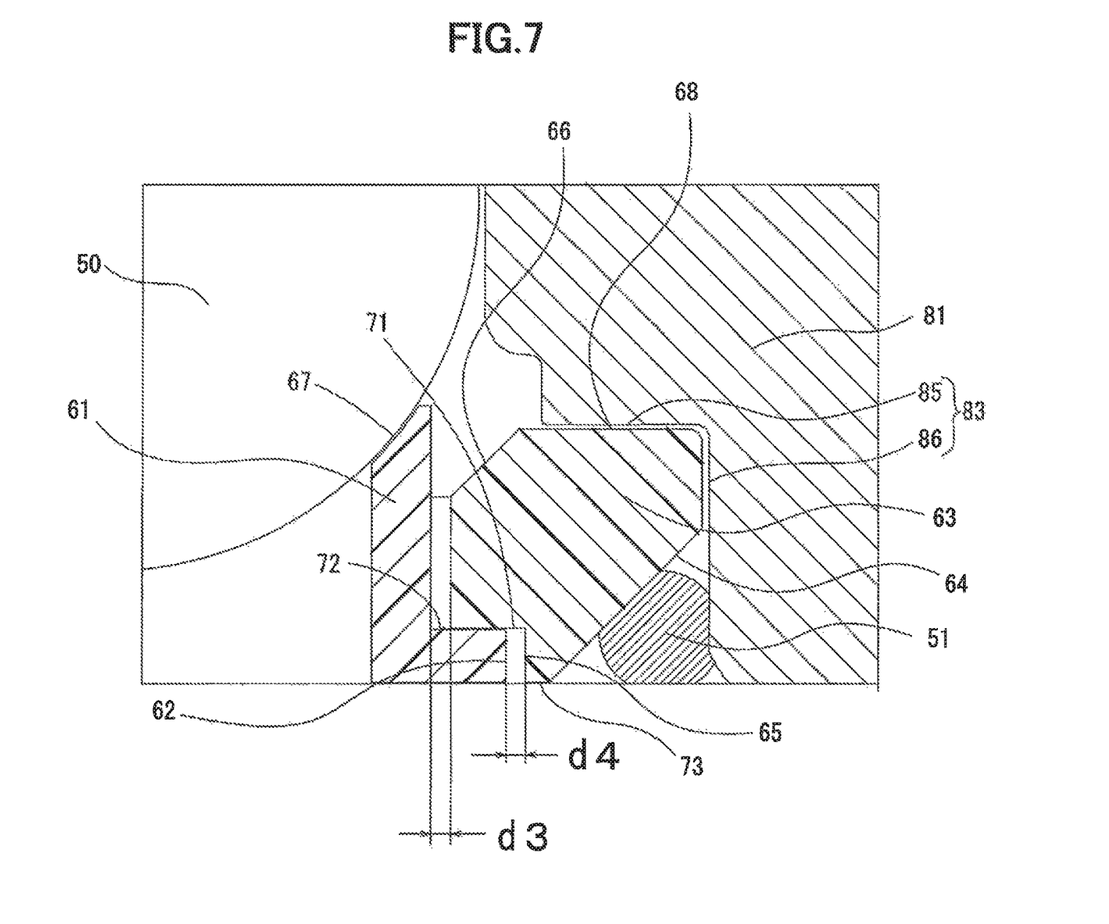
FIG. 7 is an enlarged cross-sectional view of a split structure portion of the valve seats in the ball non-return valve of FIG. 4.

A flange portion 62 is formed at a lower portion of an outer peripheral surface of the first valve seat 61, a notched portion 65 that can house the flange portion 62 is formed at a lower portion of an inner peripheral surface of the second valve seat 63, and a horizontal surface 71 of the notched portion 65 of the second valve seat 63 is partially mounted on an upper surface 72 of the flange portion 62 of the first valve seat.

An upper portion of the inner peripheral surface of the second valve seat 63 includes a tapered surface 66 whose diameter increases from the lower side to the upper side. The tapered surface 66 prevents the first valve seat 61 from coming into contact with the second valve seat 63 even if a ball seal portion 67 is deformed by colliding with the ball 50, and prevents the sealing performance of the ball 50 and the first valve seat 61 from being degraded by strain caused by the impact of the contact.

Further, the first valve seat 61 may have the recessed partial spherical part (ball seal portion) 67 at an upper portion of an inner peripheral surface of the first valve seat 61 along a surface of a sphere whose diameter is slightly larger than the diameter d2 of the ball 50. Accordingly, the sealing performance with the ball 50 can be further improved.

Moreover, the lower valve case 82 may include a mounting surface 84 on which the first valve seat 61 can be mounted, below the through-hole 90, and the upper valve case 81 may include a valve seat housing recess 83 that can house the second valve seat 63.

Further, a first clearance d3 is formed between an upper outer diameter d5 of the first valve seat 61 and an upper inner diameter d6 of the second valve seat 63, and a second clearance d4 is formed between a lower outer diameter d7 of the first valve seat 61 and a lower inner diameter d8 of the second valve seat 63. At this time, the first valve seat 61 can move horizontally on the mounting surface 84 of the lower valve case 82.

With such a configuration, strain due to the stress generated from the valve case 80 and the O-ring 51 to the second valve seat 63 during valve assembly is not transmitted to the first valve seat 61, the deformation of the first valve seat 61 is prevented, and the sealing performance with the ball 50 can be stably maintained.

It has been checked that the sealing performance of the valve is stably maintained in the range where the clearance d3 is 0.45 to 0.65 mm and the clearance d4 is 0.50 to 0.60 mm. If the clearances d3, d4 are too small, the valve seat 60 may contract or expand due to temperature changes or the like and thus the first valve seat 61 comes into contact with the second valve seat 63, and the strain due to the stress generated during valve assembly is easily transmitted from the second valve seat 63 to the first valve seat 61. If the clearances d3 and d4 are too large, the sealing performance of the valve is degraded.

Next, a sealing structure of the second valve seat 63 in the ball non-return valve 14 will be described. As illustrated in FIG. 7, the upper valve case 81 includes the valve seat housing recess 83 that can house the second valve seat 63. The second valve seat 63 is fitted into the valve seat housing recess 83 to be sealed via the O-ring 51.

Here, the second valve seat 63 may have a sealing surface 64 that the O-ring 51 comes into contact with on a part of the outer peripheral surface. At this time, an upper surface 68 of the second valve seat 63 is fitted with a horizontal surface 85 of the valve seat housing recess 83 of the upper valve case 81, so that the sealing surface 64 of the second valve seat 63, an inner peripheral surface 86 of the valve seat housing recess 83 of the upper valve case 81, and the upper surface 84 of the lower valve case 82 are sealed by the O-ring 51.

With the sealing structure described above, the second valve seat 63 can be efficiently sealed. Moreover, a horizontal mounting surface 73 that is in surface contact with the upper surface of the lower valve case 82 may be formed at a lower end of the notched portion 65 of the second valve seat 63. As a result, the sealing performance of the second valve seat 63 can be further improved.

When the ball non-return valve 14 with the structure illustrated in FIG. 4 is used as the suction ball non-return valves 11A, 11B and the discharge ball non-return valves 12A, 12B in the diaphragm pump, the strain generated by stress during valve assembly is not transmitted to the ball seal portion 67 and sealing performance can be stably maintained. Consequently, liquid leakage (backflow) inside the pump is prevented, and when all the liquid outlets are closed, the pump can be reliably stopped without continuing a low-speed operation.

Examples

Hereinafter, the present invention will be described in more detail and specifically with reference to an example and comparative examples.

Here, the product standard requirement of the valve seat 60 that does not allow the strain generated by stress during valve assembly to be transmitted to the ball seal portion 67 and that can stably maintain sealing performance is that the pump stops by closing the fluid outlet 16 when the air pressure supplied to the spool switching unit 30 is 0.2 MPa, which is the minimum value in a normal use range.

The requirement that the supplied air pressure is the minimum value in the normal use range is determined because the lower the supplied air pressure, the smaller the force with which the ball 50 is pressed against the sealing surface 67, and the influence of the distortion of the sealing surface 67 works easily and sealing does not work well. Further, the test condition satisfying the product standard requirement is that the pump stopping state is kept for three minutes or longer when the fluid outlet 16 is closed at a minimum supply air pressure of 0.2 MPa. The time is set to three minutes or longer because there is a case where a pump including a valve seat and a valve case that are made of metal stops for about three minutes.

First Example

The ball non-return valve 14 according to the present embodiment illustrated in FIG. 4 was used. The ball non-return valve is composed of two independent parts, that is, the first valve seat 61 that can support the ball 50 and seal the through-hole 90, and the second valve seat 63 that has a substantially cylindrical shape surrounding the first valve seat 61 and in which the space between the valve case 80 and the second valve seat 63 is sealed by the O-ring 51. The first clearance d3 is formed between the upper outer diameter d5 of the first valve seat 61 and the upper inner diameter d6 of the second valve seat 63, the second clearance d4 is formed between the lower outer diameter d7 of the first valve seat 61 and the lower inner diameter d8 of the second valve seat 63, the horizontal surface 71 of the notched portion 65 of the second valve seat 63 is mounted on the upper surface 72 of the flange portion 62 of the first valve seat 61, the valve seat 60 is made of a PP material, the O-ring is made of a PTFE material, and the like.

First Comparative Example

Figure 8:
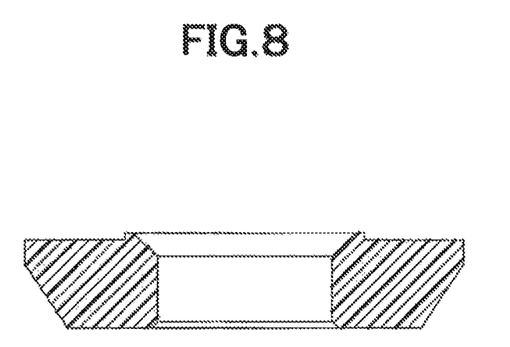
FIG. 8 is a cross-sectional view of a single valve seat according to a first comparative example.

Next, a ball non-return valve using a single valve seat having a cross-sectional shape illustrated in FIG. 8 was tested as a first comparative example instead of the split valve seat of the first example. It was designed such that the stress during valve assembly was hardly transmitted to a ball seal portion, but the ball non-return valve was far below the level that satisfied the valve seat test condition described above.

Second Comparative Example

Further, a valve seat made of PTFE that had a higher strength than PP was used for the single valve seat of the first comparative example and tested, but the valve seat test condition described above was not satisfied. Although PTFE has a higher strength than PP, PP is known to be stronger in repeated bending.

Third Comparative Example

Further, a ball non-return valve using, instead of the O-ring of the first comparative example, a fluororesin-coated O-ring was tested. The fluororesin-coated O-ring is expensive, but is more easily deformed than an O-ring made of pure PTFE because the core material is rubber, fluororubber (FKM) that can reduce reaction force to a valve seat during valve assembly is used as a core material, and fluororesin (PFA) is used as a coating. It was checked from 3D analysis that the strain of the valve seat was smaller than that of the PTFE O-ring. However, there were variations in the results depending on whether the valve seat test condition was satisfied or not, and the test condition could not be sufficiently satisfied.

Fourth Comparative Example

Further, a ball non-return valve using a fluororesin-based plate gasket instead of the O-ring of the first comparative example was tested. There was a case where the valve seat test condition described above was satisfied, but it was not possible to use the ball non-return valve because a liquid leaked to the outside of a pump when the supply pressure was medium to high pressure such as 0.4 MPa or higher.

Fifth Comparative Example

Furthermore, the ball non-return valve 14 of the first example in which no clearance was formed between the first valve seat 61 and the second valve seat 63 was tested. Although the valve test condition described above was satisfied when the valve was assembled for the first time, there were cases where the sealing function was degraded when the valve was reassembled, or reassembling was impossible due to deformation, and thus the ball non-return valve could not be used.
(Comprehensive Evaluation)

The ball non-return valves according to the first example and first to fifth comparative examples are comprehensively evaluated based on the structure, material, and clearance of the valve seat and the material of the O-ring (including substitutes). Table 1 illustrates the results of the comprehensive evaluation. ○: good, Δ: satisfying the test condition described above but not good, and x: not suitable.

TABLE 1

| | Structure | Material | Clearance | Material of O-ring | Functional Evaluation |
|---|---|---|---|---|---|
| First Example | Split | PP | Yes | PTFE | ○ |
| First Comparative Example | Single | PP | — | PTFE | x |
| Second Comparative Example | Single | PTFE | — | PTFE | x |
| Third Comparative Example | Single | PP | — | Fluororesin-coated O-ring (Coating: PFA, Core material: FKM) | Δ (Variations in results) |
| Fourth Comparative Example | Single | PP | — | Plate gasket (Fluororesin based) | Δ (Liquid leakage with medium to high supply pressure) |
| Fifth Comparative Example | Split | PP | No | PTFE | Δ (Functional degradation when reassembling or the like) |

The following points are derived from the examples described above. As illustrated in Table 1, the valve seat split structure of the first example has the effect of reducing the negative influence of strain due to stress during valve assembly, when a corrosion resistant material as a material other than metal, for example, a PP material is used for the valve seat, and a corrosion resistant material that has a relatively higher strength than the PP material, for example, PTFE is used for the O-ring as a sealing material.

It has been found from the examples described above that with the configuration of the ball non-return valve 14 according to the present embodiment, the strain generated by stress during valve assembly is not transmitted to the ball seal portion 67, and thus sealing performance can be stably maintained.

INDUSTRIAL APPLICABILITY

While the ball non-return valve used in the diaphragm pump has been described in the above embodiment, the ball non-return valve according to the present invention is not limited thereto, and can be applied to various pumps and flow passage pipes. In addition, the present disclosure is not limited to the embodiment and examples described above.

REFERENCE SIGNS LIST 1 pump main body
2, 3 disk member
4 center rod
5, 6 diaphragm
7, 8 air chamber
9, 10 pump chamber
11A, 11B suction ball non-return valve
12A, 12B discharge ball non-return valve
13 suction port
14 ball non-return valve
16 outlet
17, 18 guide bush A
19, 20 guide bush B
21 air supply port for switching port
22 exhaust port for switching port
23, 24 air supply and exhaust hole of pump main body
25 central hole of pump main body
26 dedicated air supply hole of pump main body
27 dedicated air exhaust hole of pump main body
28 groove at central portion of center rod
30 pump operating air switching mechanism (spool switching unit)

31, 32 air supply and exhaust port
33 switching port
34, 35 dedicated air exhaust port
36 spool
37 air supply port
38 sleeve
39a, 39b, 39c land
40 switching port mechanism
50 ball
51, 52A, 52B, 52C, 52D, 53A, 53B, 53C, 53D O-ring
54, 55 guide bush holder
56 central air chamber
60 valve seat
61 first valve seat
62 flange portion of first valve seat
63 second valve seat
64 sealing surface of second valve seat
65 notched portion of second valve seat
66 tapered surface of second valve seat
67 recessed partial spherical part of first valve seat (ball seal portion, sealing surface)
68 upper surface of second valve seat
71 horizontal surface of notched portion of second valve seat
72 upper surface of flange portion of first valve seat
73 horizontal mounting surface of second valve seat
80 valve case
81 upper valve case
82 lower valve case
83 valve seat housing recess of upper valve case
84 mounting surface of lower valve case (upper surface)
85 horizontal surface of valve seat housing recess
86 inner peripheral surface of valve seat housing recess
90 through-hole
s1, s2, s3 pressure receiving area of land to which air pressure is applied
d1 inner diameter of first valve seat
d2 diameter of ball
d3 first clearance
d4 second clearance
d5 upper outer diameter of first valve seat
d6 upper inner diameter of second valve seat
d7 lower outer diameter of first valve seat
d8 lower inner diameter of second valve seat

The invention claimed is:

1. A ball non-return valve comprising:
a valve case;
a valve seat; and
a ball,
wherein the valve seat is made of a corrosion resistant material and has a through-hole through which a flow of a fluid is opened and closed by the ball,
wherein the valve seat includes:
a first valve seat that can support the ball and seal the through-hole, and
a second valve seat that has a cylindrical shape surrounding the first valve seat,
a flange portion is formed at a lower portion of an outer peripheral surface of the first valve seat,
a notched portion that can house the flange portion is formed at a lower portion of an inner peripheral surface of the second valve seat,
a first clearance is formed between an upper outer diameter of the first valve seat and an upper inner diameter of the second valve seat,
a second clearance is formed between a lower outer diameter of the first valve seat and a lower inner diameter of the second valve seat, and
a horizontal surface of the notched portion of the second valve seat is mounted on an upper surface of the flange portion of the first valve seat,
wherein the valve case includes a mounting surface on which the first valve seat and the second valve seat are mounted, below the through-hole,
wherein the first valve seat and the second valve seat are horizontally movable on the mounting surface,
wherein the first clearance and the second clearance create an empty space between the first valve seat and the second valve seat for an entire vertical extent of the first valve seat and,
wherein a space between the valve case and the second valve seat is sealed by an O-ring radially disposed at least partially within an outer circumference of the second valve seat.

2. The ball non-return valve according to claim 1, wherein the valve case includes a valve seat housing recess that can house the second valve seat, and
the second valve seat is fitted into the valve seat housing recess of the valve case to be sealed via the O-ring.

3. The ball non-return valve according to claim 1, wherein an upper portion of an inner peripheral surface of the second valve seat includes a tapered surface whose diameter increases from a lower side to an upper side.

4. The ball non-return valve according to claim 2, wherein an upper portion of an inner peripheral surface of the second valve seat includes a tapered surface whose diameter increases from a lower side to an upper side.

5. The ball non-return valve according to claim 1, wherein a horizontal mounting surface that is in surface contact with the mounting surface of the valve case is formed at a lower end of the notched portion of the second valve seat.

6. A diaphragm pump in which a pair of air chambers, and a pair of pump chambers partitioned from the air chambers by diaphragms are arranged at line symmetrical positions inside a pump main body in this order from an axis of symmetry,
a suction port is connected to each of the pump chambers via a suction non-return valve, and an outlet is connected to each of the pump chambers via a discharge non-return valve,
a center rod that is connected to a pair of the diaphragms at both ends penetrates the air chambers and is supported so as to be movable in an axial direction that is orthogonal to the axis of symmetry,
air is alternately supplied to and exhausted from a pair of the air chambers to alternately increase and decrease volumes of a pair of the air chambers in order to fluctuate a pair of the diaphragms, and thus the center rod is reciprocated in the axial direction according to the fluctuation, wherein
the ball non-return valve according to claim 1 is used as the suction non-return valve and the discharge non-return valve.

7. The ball non-return valve according to claim 1, wherein the corrosion resistant material is polypropylene.

* * * * *